No. 789,026.

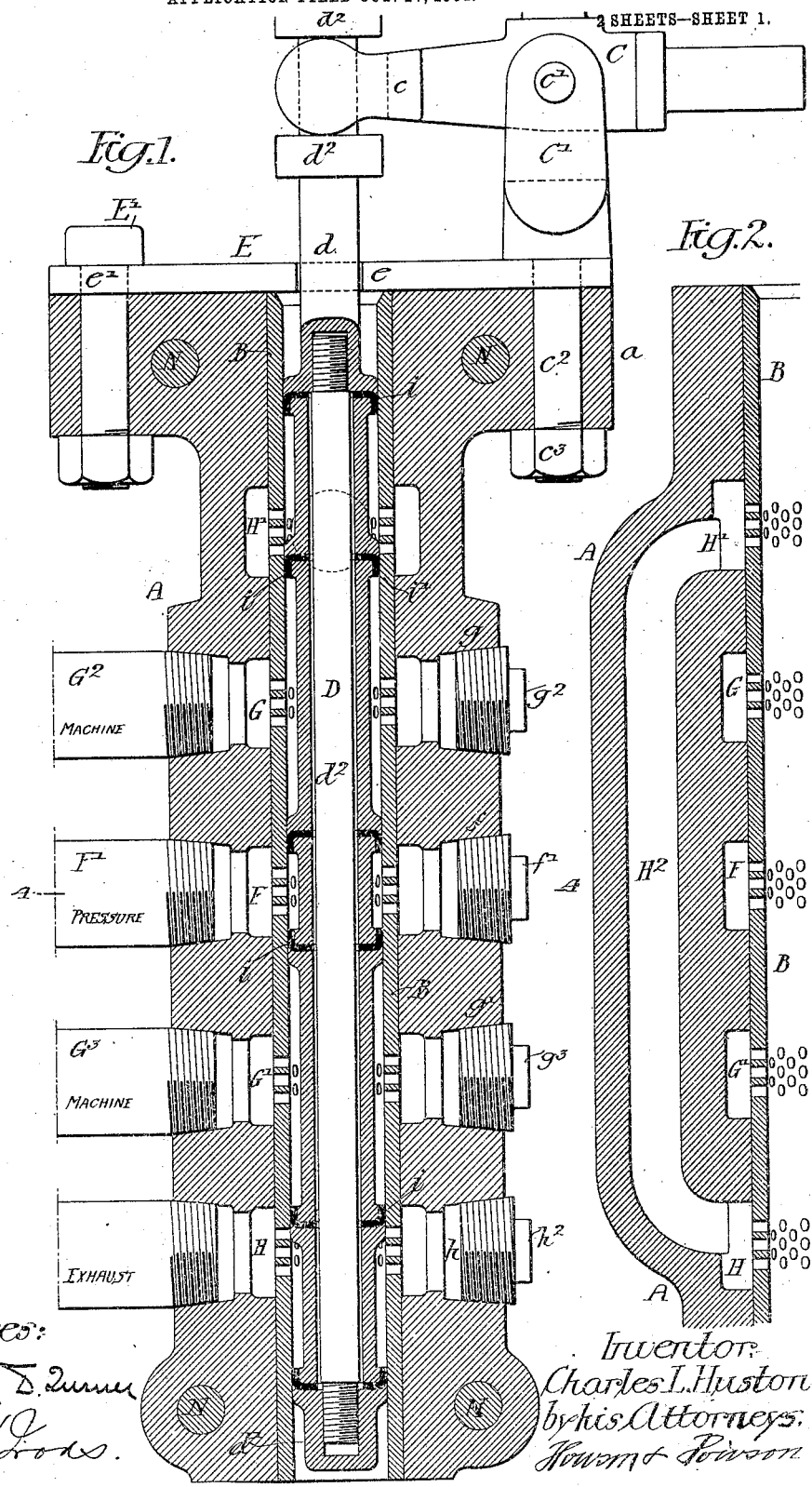

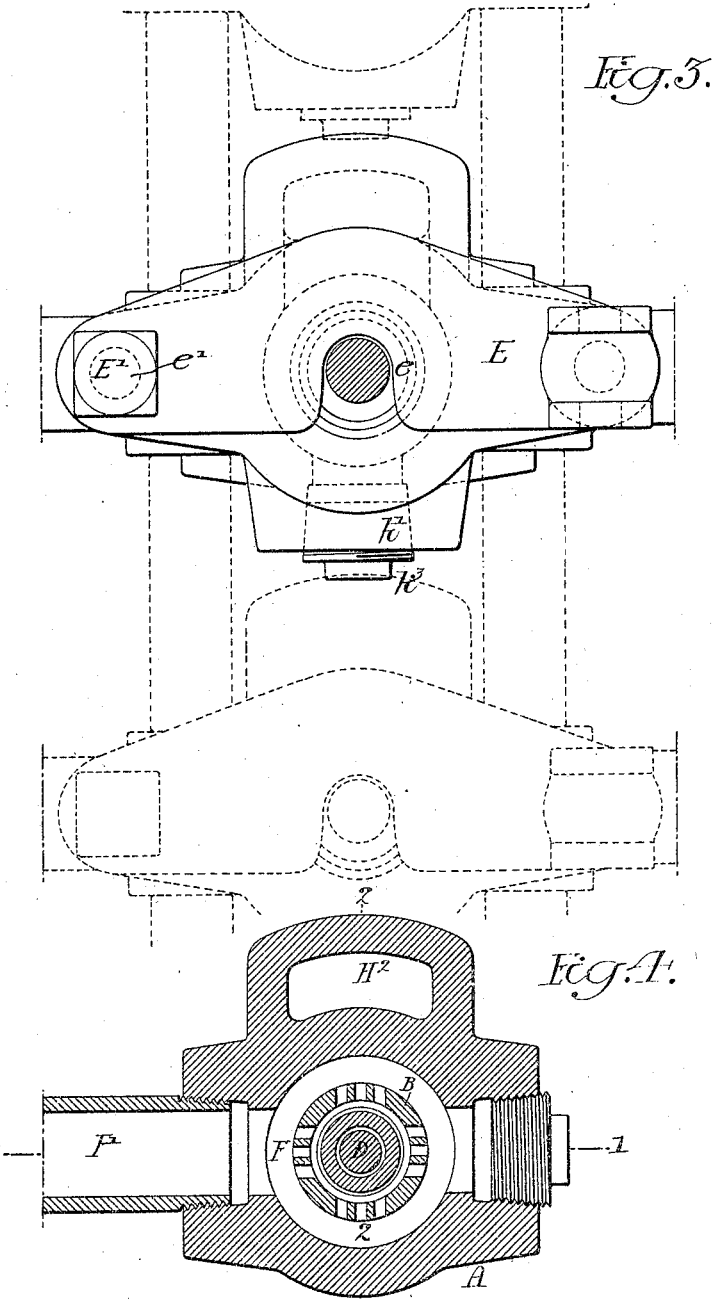

Patented May 2, 1905.

UNITED STATES PATENT OFFICE.

CHARLES L. HUSTON, OF COATESVILLE, PENNSYLVANIA.

HYDRAULIC VALVE.

SPECIFICATION forming part of Letters Patent No. 789,026, dated May 2, 1905.

Application filed October 27, 1904. Serial No. 230,194.

*To all whom it may concern:*

Be it known that I, CHARLES L. HUSTON, a citizen of the United States, residing at Coatesville, Pennsylvania, have invented certain Improvements in Hydraulic Valves, of which the following is a specification.

The object of my invention is to construct a simple and effective hydraulic valve which can be readily dismantled for repairs and which can be readily cleaned, as fully described hereinafter.

Referring to the accompanying drawings, Figure 1 is a vertical sectional view of my improved hydraulic valve on the line 1 1, Fig. 4. Fig. 2 is a sectional view on the line 2 2, Fig. 4, of one-half of the casing. Fig. 3 is a plan view, the piston being in section; and Fig. 4 is a sectional plan view on the line 4 4, Fig. 1.

A is the casing of the valve, in which is the bushing B. The casing is bored from end to end for the reception of the bushing, and this bushing is made from a plain tube perforated at the desired points.

D is a piston snugly fitting the bushing and consisting of a flanged stem $d$, a nut $d'$, intermediate sections, and a rod $d^2$, threaded at each end and adapted to the threads of the nut and the stem. The stem $d$ has two flanges $d^2$ $d^2$, between which extends the forked arm $c$ of the lever C, pivoted at $c'$ to the standard C', which has a stud $c^2$, that extends through the head $a$ of the casing A and provided with a nut $c^3$.

E is a cap-plate which is pivoted to the stud $c^2$ and extends over the bushing B, being notched at $e$ for the reception of the stem of the piston D and perforated at $e'$ for the passage of the securing-bolt E'.

In the casing is a series of ports intersecting the longitudinal opening in the casing. The ports in the present instance extend from one side of the casing to the other.

F is a central pressure-port, and G G' are two ports leading to the machine, and H is an exhaust-port at one end, which communicates with an exhaust-port H' at the opposite end of a passage $H^2$, Fig. 2. The bushing at the several ports is perforated, as clearly shown in the drawings.

A pipe F' is screwed into the casing and communicates with the pressure-port F, while the pipes $G^2 G^3$ are screwed into the casing and communicate with the ports G G', respectively, and with the machine. Plugs $f'$, $g^2$, and $g^3$ are screwed into the threaded ends $f$, $g$, and $g'$, respectively, of the ports and are preferably the same size as the pipes, so that the pipes and plugs can be arranged on either side of the casing as desired. When it is necessary to clean out the several ports, the plugs $f'$, $g^2$, and $g^3$ are removed and access can be had to the ports, and the accumulated foreign matter can be blown out, if desired, and by removing the piston the entire valve-chamber can be readily cleaned.

As before remarked, the piston is made up of a number of intermediate sections. In the present instance there are five sections mounted on the rod between the head $d$ and the nut $d'$, and between each of these sections, as well as between the sections and the head and nut, are cup-washers $i$, which are preferably arranged as illustrated in the drawings, so that while they check the flow of fluid the arrangement is such that they will not be readily cut when passing the perforations in the bushing. Furthermore, as the piston is free to turn within the bushing the cups will wear evenly.

The exhaust-port H extends from one side of the casing to the other, and an exhaust-pipe is screwed into one end of the port and a plug $h^2$ screwed into the opposite end $h$. The clean-out opening $h'$ of the port H' is closed by a plug $h^3$.

The cap-plate serves normally to limit the movement of the piston in either direction as the stem $d$ of the piston is reduced; but when the plate is thrown to one side the piston can be readily removed from the casing.

The piston of my improved valve is balanced, owing to the fact that the casing is open at both ends.

If it is necessary to replace the bushing B with a new one, all that is necessary is to force the old one out of the casing, which is open at both ends, and place another in its stead.

The design of the valve-casing is such that any number of valves can be arranged side by side, as shown by dotted lines in Fig. 3, and secured together by bolts N N (illustrated in Fig. 1) or other fastening means. The pressure-pipes of the several valves may be connected to a manifold, and the exhaust-pipes may be connected to a common manifold, while the other pipes can be coupled to independent machines, and there is a separate valve-lever for each valve, so that an operator can handle any number of machines from a single point.

It will be seen by the above description that I can cheaply construct a very efficient hydraulic valve which can be readily repaired when desired and the operating mechanism of which will work freely. By keeping a number of valve-pistons on hand a piston can be readily removed from the casing and another placed in position without cutting off the entire hydraulic mechanism, and when it is desired to clean out any one valve of a series this can be readily done by cutting out the particular valve and removing the plugs and piston.

In the drawings I have shown a four-way valve; but it will be understood that the ports may be increased or decreased in number without departing from the main feature of my invention, and the ports need not extend in a direct line from one side of the casing to the other; but the part of the port on one side of the center may be at an angle to the other part, if desired.

I claim as my invention—

1. The combination of a valve-casing, a longitudinal opening therein, a piston removable from one end of the casing, a lever for operating the piston, and a swinging plate extending over the opening and notched for the passage of the stem of the piston, substantially as described.

2. The combination in a hydraulic valve, of a casing, a longitudinal opening therein, ports communicating with the opening, a bushing mounted in the opening and having a series of perforations at the ports, a piston adapted to the bushing and extending through one end of the valve-casing, a cap pivoted to the casing and notched to receive the piston, and means for securing the cap in position, said cap extending over the bushing, substantially as described.

3. The combination in a hydraulic valve, of a casing having a flanged head at one end, a longitudinal opening extending from one end of the casing to the other and of the same diameter throughout, transverse ports intersecting said opening, a plug closing one end of each port, a bushing fitted to the opening and perforated at the ports, a piston mounted in the bushing and having a stem, a standard secured to the head of the casing, a lever hung to said standard and connected to the stem of the piston, a plate pivoted to the head and arranged to pass over the opening in the casing, and means for securing the plate in position, said plate being notched for the passage of the stem of the piston, substantially as described.

4. The combination in a hydraulic valve, of a casing open from end to end, ports in said casing, a piston mounted in the opening and having a reduced stem forming shoulders, means for operating the piston, and a pivoted cap-plate arranged to extend over the opening in the casing and notched for the passage of the stem of the piston, said cap-plate limiting the movement of the piston, substantially as described.

In testimony whereof I have signed my name to this specification in the presence of two subscribing witnesses.

CHAS. L. HUSTON.

Witnesses:
 WILL. A. BARR,
 WALTER CHISM.